(12) United States Patent
Kim et al.

(10) Patent No.: US 12,118,394 B2
(45) Date of Patent: Oct. 15, 2024

(54) METHOD AND APPARATUS FOR MEMORY INTEGRATED MANAGEMENT OF CLUSTER SYSTEM

(71) Applicant: Electronics and Telecommunications Research Institute, Daejeon (KR)

(72) Inventors: Changdae Kim, Daejeon (KR); Kwang-Won Koh, Daejeon (KR); Kang Ho Kim, Daejeon (KR); Taehoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 465 days.

(21) Appl. No.: 17/517,284

(22) Filed: Nov. 2, 2021

(65) Prior Publication Data

US 2022/0300331 A1    Sep. 22, 2022

(30) Foreign Application Priority Data

Mar. 22, 2021 (KR) .......................... 10-2021-0036414

(51) Int. Cl.
*G06F 9/50*     (2006.01)
*G06F 9/455*    (2018.01)

(52) U.S. Cl.
CPC ........ *G06F 9/5016* (2013.01); *G06F 9/45558* (2013.01); *G06F 9/5077* (2013.01); *G06F 2009/45562* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,229,651 B2 | 1/2016 | Min et al. | |
| 9,448,833 B1* | 9/2016 | Lao | G06F 9/45558 |
| 9,977,618 B2 | 5/2018 | Sharma et al. | |
| 10,754,547 B2 | 8/2020 | Kim et al. | |
| 10,929,284 B2 | 2/2021 | Jung et al. | |
| 2010/0161909 A1* | 6/2010 | Nation | G06F 9/5016 |
| | | | 711/147 |

(Continued)

FOREIGN PATENT DOCUMENTS

| | | |
|---|---|---|
| KR | 1020110070429 A | 6/2011 |
| KR | 1020140078390 A | 6/2014 |

(Continued)

*Primary Examiner* — Charles E Anya
(74) *Attorney, Agent, or Firm* — William Park & Associates Ltd.

(57) ABSTRACT

An apparatus for memory integrated management in a cluster system including a plurality of physical nodes connected to each other by a network determines one of the plurality of physical nodes as a node to place a new virtual machine, allocates the first type of memory allocated to the one physical node to the new virtual machine as much as the memory capacity required by the new virtual machine, and distributes the second type of memory to a plurality of virtual machines running on the plurality of physical nodes by integrating and managing the second type of memory allocated to each of the plurality of physical nodes. In this case, the access speed of the second type of memory is faster than that of the first type of memory.

7 Claims, 7 Drawing Sheets

(56) References Cited

U.S. PATENT DOCUMENTS

| | | | |
|---|---|---|---|
| 2010/0205395 A1* | 8/2010 | Srinivasan | G06F 9/45558 718/1 |
| 2011/0283277 A1* | 11/2011 | Castillo | G06F 12/08 718/1 |
| 2012/0047313 A1* | 2/2012 | Sinha | G06F 9/5016 711/170 |
| 2015/0040129 A1* | 2/2015 | Park | G06F 9/4856 718/1 |
| 2015/0186069 A1* | 7/2015 | Sharma | G06F 9/5016 711/153 |
| 2019/0138341 A1 | 5/2019 | Koh et al. | |
| 2021/0124602 A1* | 4/2021 | Tsirkin | G06F 9/5077 |

FOREIGN PATENT DOCUMENTS

| | | | |
|---|---|---|---|
| KR | 101849116 B1 | 5/2018 | |
| KR | 1020190042465 A | 4/2019 | |
| KR | 1020200002581 A | 1/2020 | |
| KR | 1020200044427 A | 4/2020 | |
| WO | WO 2014059613 A1 * | 4/2014 | G06F 12/0638 |

\* cited by examiner

METHOD AND APPARATUS FOR MEMORY INTEGRATED MANAGEMENT OF CLUSTER SYSTEM

CROSS-REFERENCE TO RELATED APPLICATION

This application claims priority to and the benefit of Korean Patent Application No. 10-2021-0036414 filed in the Korean Intellectual Property Office on Mar. 22, 2021, the entire contents of which are incorporated herein by reference.

BACKGROUND OF THE INVENTION (a) Field of the Invention

The present invention relates to a method and apparatus for memory integrated management of a duster system, and more particularly, to a method and apparatus for integrated management of memory of a duster system for integrating and managing memories mounted on computer nodes connected to a high-speed network in a duster system.

(b) Description of the Related Art

As the amount of data processed by the computer increases exponentially and the amount of data that needs to be processed in real time increases, the demand for the capacity of the memory, which is the fastest data storage in the computer, is increasing. However, dynamic random access memory (DRAM) memory, which is currently widely used as a memory, has limitations in capacity expansion due to technical limitations. There is a limit to the number of memories that can be connected to one CPU (Central Processing Unit), and there are many limitations to the capacity expansion of a single DRAM due to problems with the DRAM structure and performance specifications of the DRAM.

Accordingly, memory expansion technology is being developed. The memory expansion technology is called a partitioned memory or a disaggregated memory, and is a technology that utilizes devices partitioned or separated from a DRAM directly connected to a CPU, which means a general memory, as an expanded memory space. For memory expansion, technologies that utilize DRAM from other computers connected to high-speed networks, which have a speed of 10 Gbps or higher, such as InfiniBand, and technologies that utilize non-volatile memory or high-performance memory installed in the computer, have been developed. However, since DRAM has the above-mentioned limitation of capacity expansion, there is a limitation of capacity expansion even if DRAMs of other computers are connected, and since it is a resource that can be usefully used in other computers, the cost of memory expansion can be expensive. In addition, since the access speed of non-volatile memory or high-performance solid state drive (SSD) is tens of times slower than that of a DRAM, application performance may be greatly reduced. It is also generally slower than a DRAM in other computers connected over a high-speed network.

One of the problems with the memory expansion technology is that the application performance fluctuates greatly. The higher the rate at which the application accesses the DRAM directly connected to the CPU, the higher the performance, but application performance may be greatly reduced according to the rate at which the application accesses the expanded memory. The rate at which the application accesses the expanded memory depends not only on the memory access pattern of the application, but also on the amount of DRAM installed in the computer, and also on how much of the DRAM is being used by other applications sharing the DRAM.

Two technologies have been developed to solve these problems.

The first is a memory profiling technique for systems using memory expansion techniques. This is a technology that profiles the memory access pattern of the virtual machine and calculates the performance load of the application running in the virtual machine according to the available DRAM capacity and the expanded memory capacity. Using this technology, it is possible to determine the DRAM capacity required to guarantee the performance of a virtual machine above a certain level. However, there is no provision in case DRAM capacity is left or runs out.

The second is a memory management technology of a single node. This is a method of adjusting the DRAM capacity used by each virtual machine according to the number of swaps in and swaps out of each virtual machine, for a memory expansion system based on a swap system of Linux. It is a technology that increases the average performance of virtual machines in a computer by allowing more DRAM to be used for virtual machines with a large number of accesses to the expanded memory. However, since only the DRAM capacity of virtual machines running on the single node is adjusted, there is a limit to the amount of resources that can be adjusted.

SUMMARY OF THE INVENTION

The present invention has been made in an effort to provide a method and apparatus for memory integrated management of a cluster system that can maximize the overall throughput of virtual machines by minimizing performance degradation due to memory expansion while expanding the total memory capacity that can be utilized by a plurality of virtual machines running in the cluster system.

According to an embodiment, a method for memory integrated management in an apparatus for memory integrated management of a cluster system including a plurality of physical nodes connected to each other by a network is provided. The method for memory integrated management includes: determining one of the plurality of physical nodes as a node to place a new virtual machine; allocating the first type of memory allocated to the one physical node to the new virtual machine as much as the memory capacity required by the new virtual machine; and distributing the second type of memory to a plurality of virtual machines running on the plurality of physical nodes by integrating and managing the second type of memory allocated to each of the plurality of physical nodes, wherein the memory of the second type has a faster access speed than that of the first type of memory.

The distributing of the second type of memory may include: profiling a memory access pattern of each of the plurality of virtual machines; and distributing the second type of memory to the plurality of virtual machines in a direction that can maximize the average performance of the plurality of virtual machines based on the profiling information of the plurality of virtual machines.

The determining may include: selecting a physical node in which the amount of the first type of memory available from among the plurality of physical nodes is greater than the memory capacity required for the new virtual machine;

calculating the average performance of virtual machines running on each of the selected physical nodes; and determining a physical node having the highest average performance of the running virtual machines as a node on which to place the new virtual machine.

The distributing of the second type of memory may include: distributing the second type of memory allocated to each physical node to virtual machines running in the corresponding physical node, respectively; and additionally distributing the remaining second type of memory in the cluster system to at least one virtual machine among the plurality of virtual machines.

The distributing of the second type of memory allocated to each physical node to virtual machines running in the corresponding physical node, respectively, may include: distributing the memory of the second type as much as the memory capacity required to guarantee the performance of the virtual machine for each virtual machine running in the corresponding physical node; and repeating the reducing step until the capacity of the second type of memory allocated to the virtual machine running in the corresponding physical node does not exceed the capacity of the second type of memory allocated to the corresponding physical node.

The distributing the second type of memory allocated to each physical node to virtual machines running in the corresponding physical node, respectively, may further include repeating the reducing step until the capacity of the second type of memory allocated to the virtual machine running in the corresponding physical node does not exceed the capacity of the second type of memory allocated to the corresponding physical node.

The additionally distributing may include: increasing the second type of memory by a unit capacity to a virtual machine of which performance is increased the most when the second type of memory is increased by the unit capacity among the plurality of virtual machines running in the plurality of physical nodes; and repeating the increasing step until all of the remaining second type of memory in the cluster system is distributed.

The first type of memory may have a larger capacity than the second type of memory.

The second type of memory may include a dynamic random access memory (DRAM).

According to another embodiment, an apparatus for memory integrated management in a cluster system including a plurality of physical nodes connected to each other by a network is provided. The apparatus for memory integrated management includes a high-integration memory distributor and a high-performance memory distributor. The high-integration memory distributor integrates and manages a first type of memory allocated to the plurality of physical nodes, and distributes the first type of memory allocated to the corresponding physical node to virtual machines each executed in the plurality of physical nodes. The high-performance memory distributor integrates and manages a second type of memory allocated to the plurality of physical nodes, respectively, and distributes the second type of memory to a plurality of virtual machines in the cluster system in a direction that can maximize the average performance of the plurality of virtual machines. At this time, the memory of the second type has a faster access speed than that of the first type of memory.

The high-integration memory distributor may distribute the first type of memory by as much as the memory capacity required by a new virtual machine when the new virtual machine is generated.

The high-integration memory distributor may select a physical node in which the amount of the first type of memory available from among the plurality of physical nodes is greater than the memory capacity required for the new virtual machine, and may determine a physical node having the highest average performance of the running virtual machines running on each of the selected physical nodes among the selected physical nodes, as a node on which to place the new virtual machine.

The high-performance memory distributor may distribute the second type of memory allocated to each physical node to virtual machines running in the corresponding physical node, respectively, and may additionally distribute the remaining second type of memory in the cluster system to at least one virtual machine among the plurality of virtual machines.

The high-performance memory distributor may distribute the memory of the second type by as much as the memory capacity required to guarantee the performance of the virtual machine for each virtual machine running in the corresponding physical node, and may reduce the second type of memory of the virtual machine of which performance is reduced the least when the second type of memory is reduced by the unit capacity set for each virtual machine, by the unit capacity when the second type of memory distributed to the virtual machine running in the corresponding physical node exceeds the capacity of the second type of memory allocated to the corresponding physical node.

When the remaining second type of memory in the cluster system is present, the high-performance memory distributor may increase the second type of memory by a unit capacity to a virtual machine of which performance is increased the most when the second type of memory is increased by the unit capacity among the plurality of virtual machines running in the plurality of physical nodes.

The apparatus for memory integrated management further may include a plurality of memory profilers that predict performance changes of the plurality of virtual machines by profiling the memory access patterns of each of the plurality of virtual machines.

The central processing units (CPUs) in the plurality of physical nodes may be directly connected to the second type of memory.

The high-performance memory distributor may allocate a second type of memory allocated to one physical node to a virtual node running in another physical node.

DETAILED DESCRIPTION OF THE EMBODIMENTS

Figure 1:
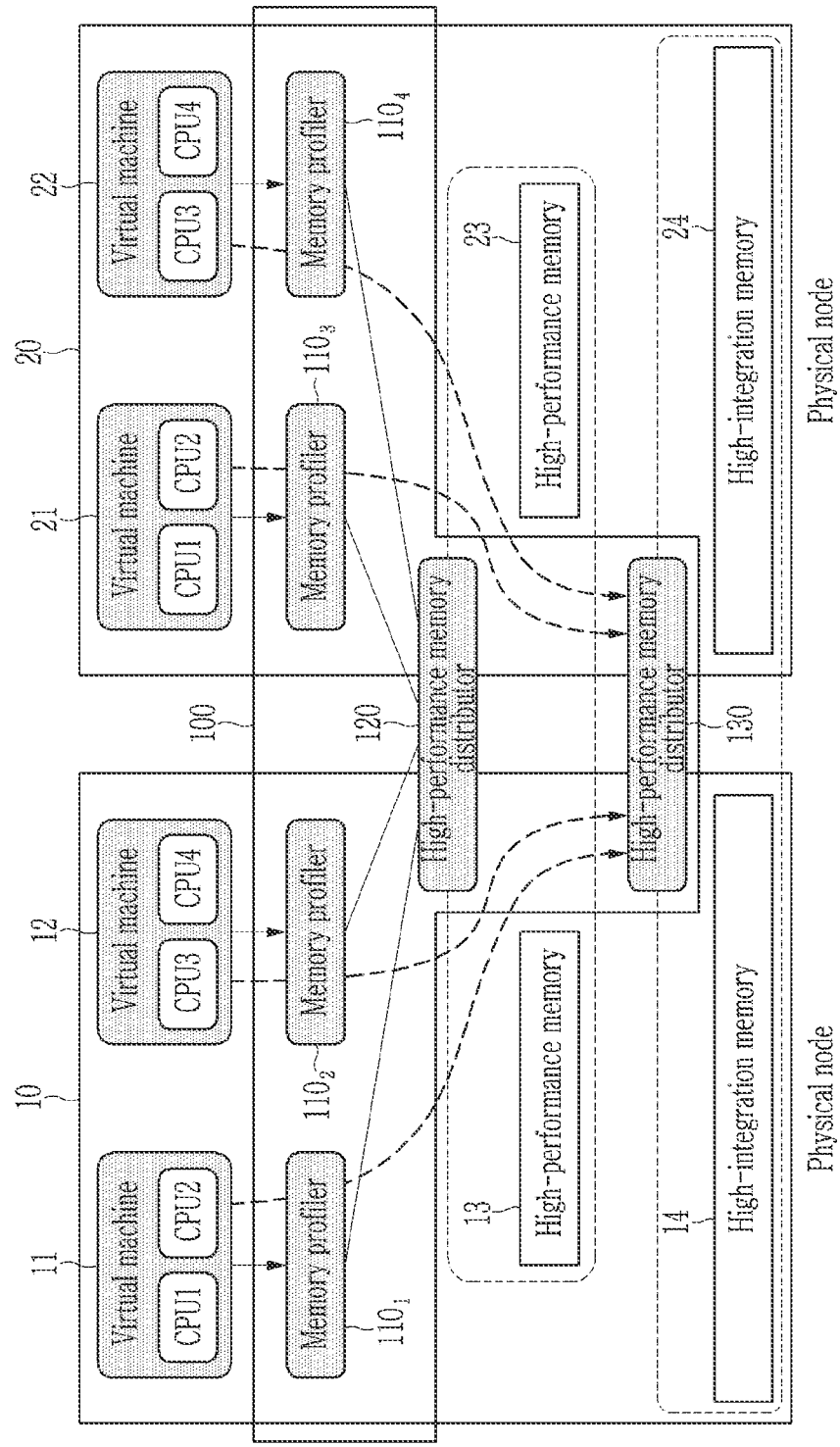
FIG. 1 is a diagram illustrating an example of a cluster system according to an embodiment.

Hereinafter, embodiments of the present invention will be described in detail with reference to the attached drawings so that a person of ordinary skill in the art may easily implement the present invention. The present invention may be modified in various ways, and is not limited thereto. In the drawings, elements that are irrelevant to the description of the present invention are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

A method and apparatus for memory integrated management in a cluster system according to an embodiment will now be described in detail with reference to the drawings.

FIG. 1 is a diagram illustrating an example of a cluster system according to an embodiment.

Referring to FIG. 1, the duster system connects a plurality of physical nodes 10 and 20 through a network to operate as one system.

Each physical node 10 and 20 uses allocated hardware resources. The hardware resources may include a CPU and memories 13, 14, 23, and 24, and the like.

The memories 13 and 23 are memories that the CPU can access at the fastest speed, and are hereinafter referred to as high-performance memories. In most servers, DRAM is used as the high-performance memories 13 and 23.

The memory 14 and 24 are memories that the CPU can access at a slower speed than the high-performance memories 13 and 23, but has a larger capacity than the high-performance memories 13 and 23, and are hereinafter referred to as high-integration memories. The high-integration memories 14 and 24 may include, for example, non-volatile memory or a high-performance SSD.

At least one of virtual machines 11, 12, 21, and 22 may be executed in each physical node 10 and 20.

The virtual machines 11, 12, 21, and 22 may operate using hardware resources in the corresponding physical nodes 10 and 20. In FIG. 1, for convenience of explanation, two physical nodes 10 and 20 and two of virtual machines 11, 12, 21, and 22 executed in each physical node 10 and 20, are shown.

For example, the virtual machine 11 executed in the physical node 10 may use CPU1 and CPU2 of the physical node 10, and the virtual machine 12 executed in the physical node 10 may use CPU3 and CPU4 of the physical node 10. The virtual machine 21 executed in the physical node 20 may use CPU1 and CPU2 of the physical node 20, and the virtual machine 22 executed in the physical node 20 may use CPU3 and CPU4 of the physical node 20.

The cluster system according to an embodiment may further include an apparatus for memory integrated management 100.

The apparatus for memory integrated management 100 provides memory expansion of the virtual machines 11, 12, 21, and 22, by integrating and managing the high-performance memories 13 and 23 and the high-integration memories 14 and 24 of the physical nodes 10 and 20 connected through the network. Memory expansion means utilizing high-performance memories of the corresponding physical node, for example, 10, as well as high-performance memories or high-integration memories of another physical node for example, 20, or high-integration memories of the corresponding physical node 10.

The apparatus for memory integrated management 100 may include memory profilers $110_1$, $110_2$, $110_3$, and $110_4$, a high-performance memory distributor 120, and a high-integration memory distributor 130.

Each memory profiler $110_1$, $110_2$, $110_3$, and $110_4$ may be provided corresponding to each virtual machine 11, 12, 21, and 22.

The memory profilers $110_1$, $110_2$, $110_3$, and $110_4$ profile memory access patterns of the corresponding virtual machines 11, 12, 21, and 22, respectively. The memory profilers $110_1$, $110_2$, $110_3$, and $110_4$ estimate the number of accesses to the expanded memory when the virtual machines 11, 12, 21, and 22 increase and decrease memory capacity from the high-performance memory capacity currently used, respectively, and predict the amount of performance change of the virtual machines 11, 12, 21, and 22.

Specifically, the memory profilers $110_1$, $110_2$, $110_3$, and $110_4$ may numerically calculate the performance at the current point in time when the memory expansion is being used when the performance when the virtual machine uses only a high-performance memory is expressed as 1. In addition, the memory profilers $110_1$, $110_2$, $110_3$, and $110_4$ may numerically represent the performance when the high-performance memory capacity is reduced by unit capacity (e.g., 1 GB) compared to the performance when the virtual machine uses only high-performance memories. Similarly, the memory profilers $110_1$, $110_2$, $110_3$, and $110_4$ may numerically represent the performance when the high-performance memory capacity is increased by the unit capacity compared to the performance when the virtual machine uses only the high-performance memories.

The high-performance memory distributor 120 integrates and manages the high-performance memories 13 and 23 in the duster system, and distributes the high-performance memories 13 and 23 to the virtual machines 11, 12, 21, and 22 in a way that can maximize the average throughput of all virtual machines 11, 12, 21, and 22 in a duster system based on the profiling information of the memory profilers $110_1$, $110_2$, $110_3$, and $110_4$. The high-performance memory distributor 120 first distributes the high-performance memories 13 and 23 in the physical nodes 10 and 20 to the virtual machines 11, 12, 21, and 22 in the corresponding physical nodes 10 and 20 through local high-performance memory distribution for each physical node. Here, the local high-performance memory distribution means allocating the high-performance memory 13 of the corresponding physical node (e.g., 10) only to the virtual machines 11 and 12 in the corresponding physical node 10. Thereafter, if high-performance memory in the duster system remains, the high-performance memory distributor 120 may additionally distribute the remaining high-performance memory to the at least one virtual machines 11, 12, 21, and 22. The operation of the high-performance memory distributor 120 will be described in detail with reference to FIGS. 2 and 3.

The high-integration memory distributor 130 integrates and manages the high-integration memories 14 and 24 in the cluster system, and distributes the high-integration memories 14 and 24 by as much as the memory capacity required by the virtual machines 11, 12, 21, and 22 to the virtual machines 11, 12, 21, and 22. The high-integration memory distributor 130 operates when a virtual machine is newly generated. The high-integration memories 14 and 24 are used to secure the memory capacity required by the virtual machines 11, 12, 21, and 22 in the corresponding physical nodes 10 and 20. The operation of the high-integration memory distributor 130 will be described in detail with reference to FIG. 4.

Figure 2:
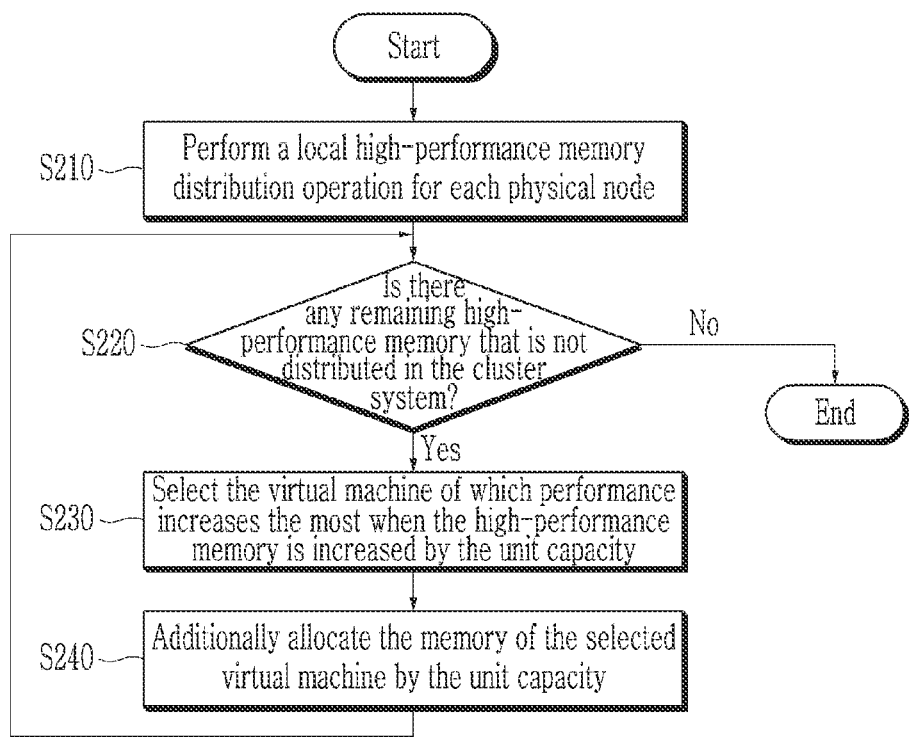
FIG. 2 is a flowchart illustrating an operation method of the high-performance memory distributor shown in FIG. 1.

FIG. 2 is a flowchart illustrating an operation method of the high-performance memory distributor shown in FIG. 1.

Referring to FIG. 2, the high-performance memory distributor 120 performs a local high-performance memory distribution operation for each physical node (S210).

After the distribution of local high-performance memory to each physical node 10 and 20 is completed, the high-performance memory distributor 120 checks whether there is any remaining high-performance memory that is not distributed in the cluster system (S220). The high-performance memory distributor 120 may remain a high-performance memory when the high-performance memory capacity required to guarantee the specified performance of the virtual machine in one physical node is small. For example, if a virtual machine with high capacity memory is generated to process large data sometimes, even a small capacity of the high-performance memory can provide sufficient performance for most of the time, and the virtual machine may be in idle state, while the number of virtual machines running in the cluster system may be small.

When there is high-performance memory remaining in the cluster system, the high-performance memory distributor 120 selects the virtual machine of which performance increases the most when the high-performance memory is increased by the unit capacity (S230), and additionally allocates the memory of the selected virtual machine by the unit capacity (S240). Here, the word performance refers to the performance when the virtual machine uses memory expansion compared to the performance when the virtual machine uses only high-performance memory, as described in the memory profiler above. The performance can be estimated using a memory profiler.

Next, the high-performance memory distributor 120 checks whether there is a high-performance memory that is not distributed in the cluster system (S220), and performs the step S230.

The high-performance memory distributor 120 may allocate high-performance memory to all virtual machines 11, 12, 21, and 22 in the duster system by repeating steps S220 and S230 until there is no remaining high-performance memory in the duster system.

Figure 3:
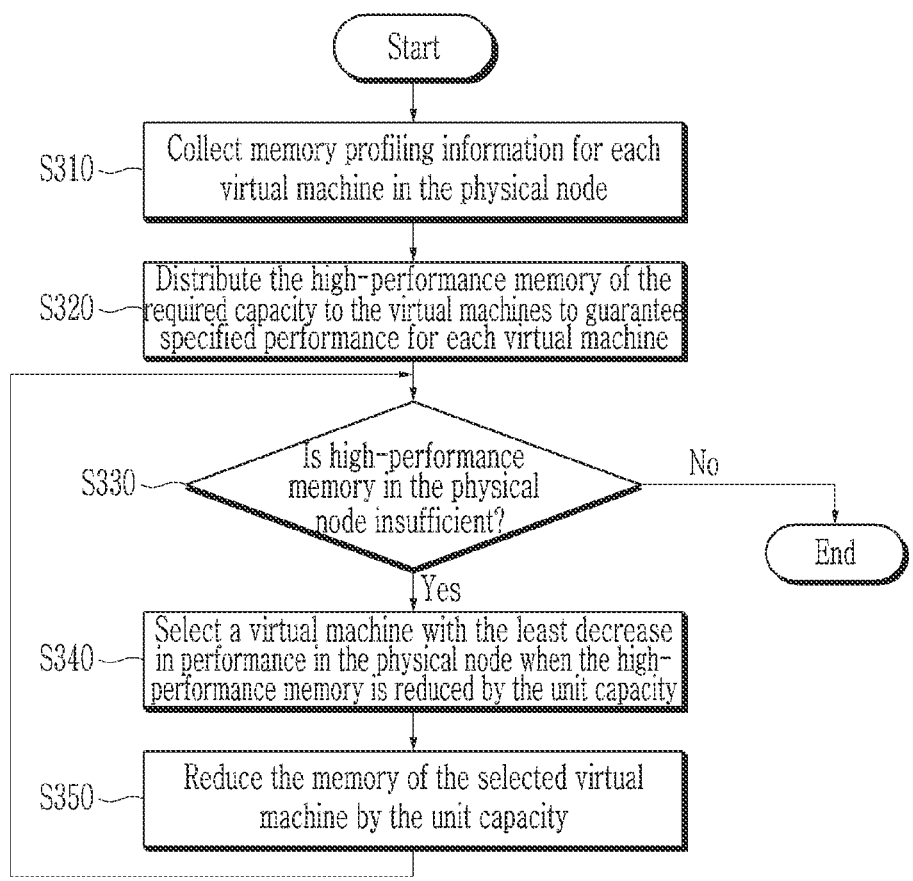
FIG. 3 is a flowchart illustrating a method for distributing local high-performance memory shown in FIG. 3.

FIG. 3 is a flowchart illustrating a method for distributing local high-performance memory shown in FIG. 3. In FIG. 3, one physical node 10 will be described as an example, and the described local high performance memory distribution operation may be equally applied to the remaining physical nodes 20.

Referring to FIG. 3, the high-performance memory distributor 120 collects memory profiling information for each virtual machine 11 and 12 in the physical node 10 (S310). The performance of the virtual machines 11 and 12 using the memory expansion can be estimated through the memory profilers 110$_1$ and 110$_2$ corresponding to each of the virtual machines 11 and 12. The high-performance memory distributor 120 collects performance estimates through memory profilers 110$_1$ and 110$_2$.

The high-performance memory distributor 120 distributes the high-performance memory 13 of the required capacity to the virtual machines 11 and 12 to guarantee specified performance based on the memory profiling information for each virtual machine 11 and 12 (S320).

The high-performance memory distributor 120 determines whether the high-performance memory 13 in the physical node 10 is insufficient (S330).

When the capacity of the high-performance memory 13 mounted on the physical node 10 is insufficient, the high-performance memory distributor 120 selects a virtual machine with the least decrease in performance in the physical node when the high-performance memory is reduced by the unit capacity (S340), and reduces the memory of the selected virtual machine by the unit capacity (S350).

The high-performance memory distributor 120 determines again whether the high performance memory 13 in the physical node 10 is insufficient (S330), and performs steps S340 and S350.

The memory distributor 120 repeats steps S330 to S350 so that the high-performance memory distributed to the virtual machines 11 and 12 in the physical node 10 does not exceed the capacity of high-performance memory mounted on the physical node 10.

Through this, the average throughput of the virtual machines 11 and 12 in the physical node 10 can be increased.

Figure 4:
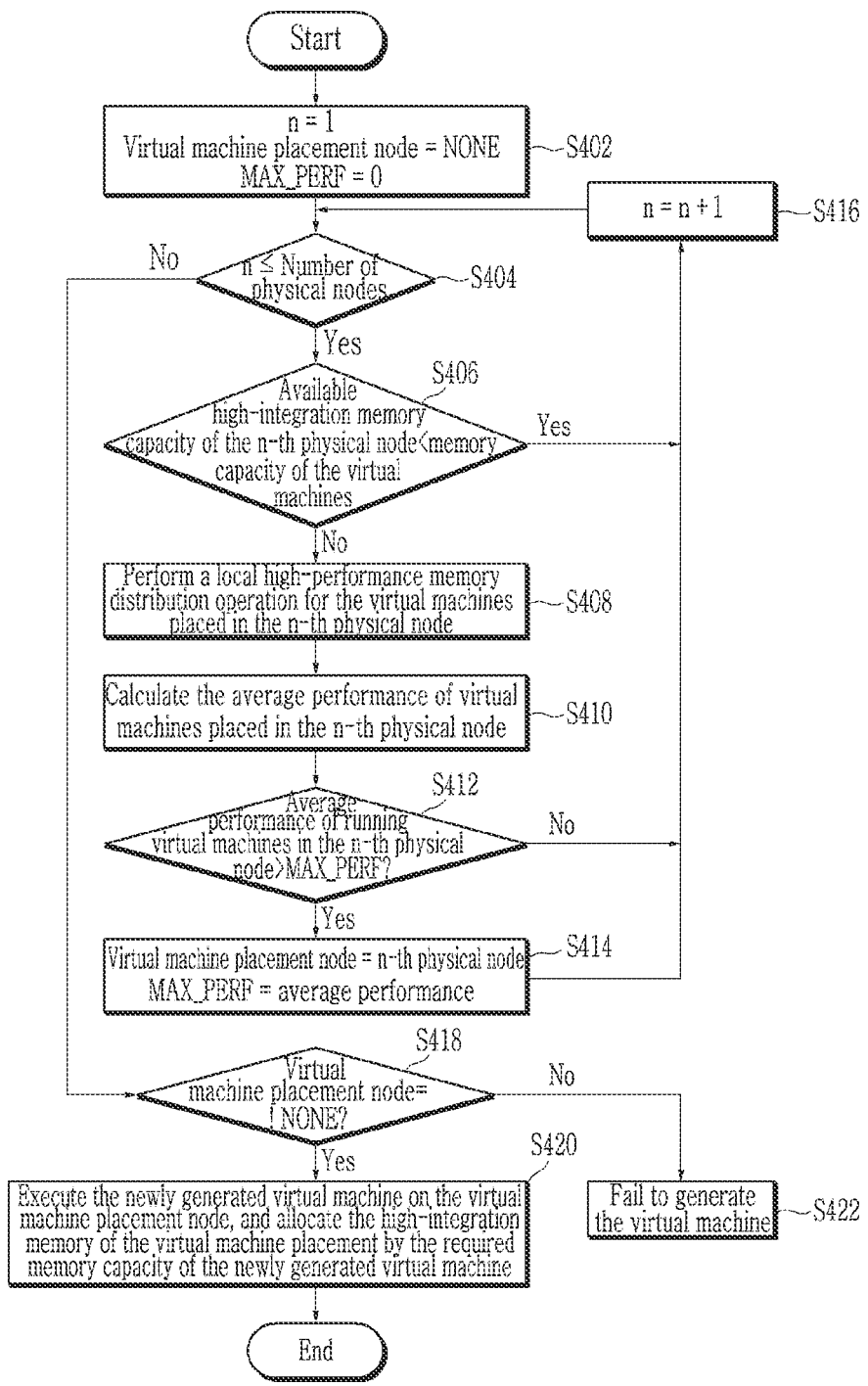
FIG. 4 is a flowchart illustrating an operation method of the high-integration memory distributor shown in FIG. 1.

FIG. 4 is a flowchart illustrating an operation method of the high-integration memory distributor shown in FIG. 1.

Referring to FIG. 4, when a virtual machine is newly generated, the high-integration memory distributor 130 first selects a physical node on which the virtual machine is to be placed. If the available high-integration memory 14 of the physical node 10 is less than the memory capacity required by the virtual machine, the virtual machine is not placed in the corresponding physical node 10.

Specifically, in order to select a physical node to place the virtual machine, the high-integration memory distributor 130 is initialized to n=1, virtual machine placement node=NONE, and the threshold value MAX_PERF=0 (S402). Here, n represents a number for identifying a physical node.

The high-integration memory distributor 130 performs the following operation for the n-th physical node from n=1.

The high-integration memory distributor 130 checks whether n is greater than the number of physical nodes (S404). When n is greater than the number of physical nodes, it means that the process of checking whether the corresponding physical node is a node to place the virtual machine for all physical nodes in the duster system has been performed.

The high-integration memory distributor 130 checks whether the available high-integration memory capacity of the n-th physical node is less than the memory capacity of the virtual machines (S406).

The high-integration memory distributor 130 does not place the virtual machine in the corresponding physical node 10 when the available high-integration memory capacity of the n-th physical node is less than the memory capacity of the virtual machines. In this case, the high-integration memory distributor 130 increases n=n+1 (S416) and checks whether the next physical node is a node capable of placing a virtual machine by performing again from step S404.

If the available high-integration memory capacity of the n-th physical node is greater than or equal to the memory capacity of the virtual machines, the high-integration memory distributor 130 performs a local high-performance memory distribution operation for the virtual machines that are already placed and running in the n-th physical node (S408), and calculates the average performance of virtual machines running in the n-th physical node (S410). The local high-performance memory distribution operation for the n-th physical node is as described in FIG. 3. This process is to check the average performance of the already placed and running virtual machines by utilizing the memory profiling information at the time of placing the newly generated virtual machine.

The high-integration memory distributor 130 checks whether the average performance of running virtual machines in the n-th physical node is greater than the threshold value (MAX_PERF) (S412).

If the average performance of the n-th physical node is greater than the threshold value MAX_PERF, the high-integration memory distributor 130 updates the n-th physical node as a virtual machine placement node, and updates the threshold value MAX_PERF to the average performance of the n-th physical node (S414).

Next, the high-integration memory distributor 130 increases n=n+1 (S416) and performs step S404 for the next physical node, and checks whether the next physical node is a node capable of placing a virtual machine.

In this way, after checking whether a node can place virtual machines for all physical nodes in the cluster system, the physical node with the highest average performance of running virtual machines is selected as the virtual machine placement node. Through this process, the physical node selected as the virtual machine placement node has available high-integration memory of as much as the amount of memory required by the virtual machine, and it is highly likely to have the least effect on the average performance of virtual machines running in the entire cluster system when a portion of high-performance memory is distributed to the newly generated virtual machine.

The high-integration memory distributor 130 checks whether a physical node selected as a virtual machine placement node exists (S418).

When the physical node selected as the virtual machine placement node exists, the high-integration memory distributor 130 places and executes the newly generated virtual machine on the physical node selected as the virtual machine placement node, and allocates the high-integration memory of the physical node selected as the virtual machine placement node by the required memory capacity of the newly generated virtual machine to the newly generated virtual machine (S420).

If the node selected as the virtual machine placement node does not exist, the high-integration memory distributor 130 fails to generate the virtual machine (S422).

Figure 5:
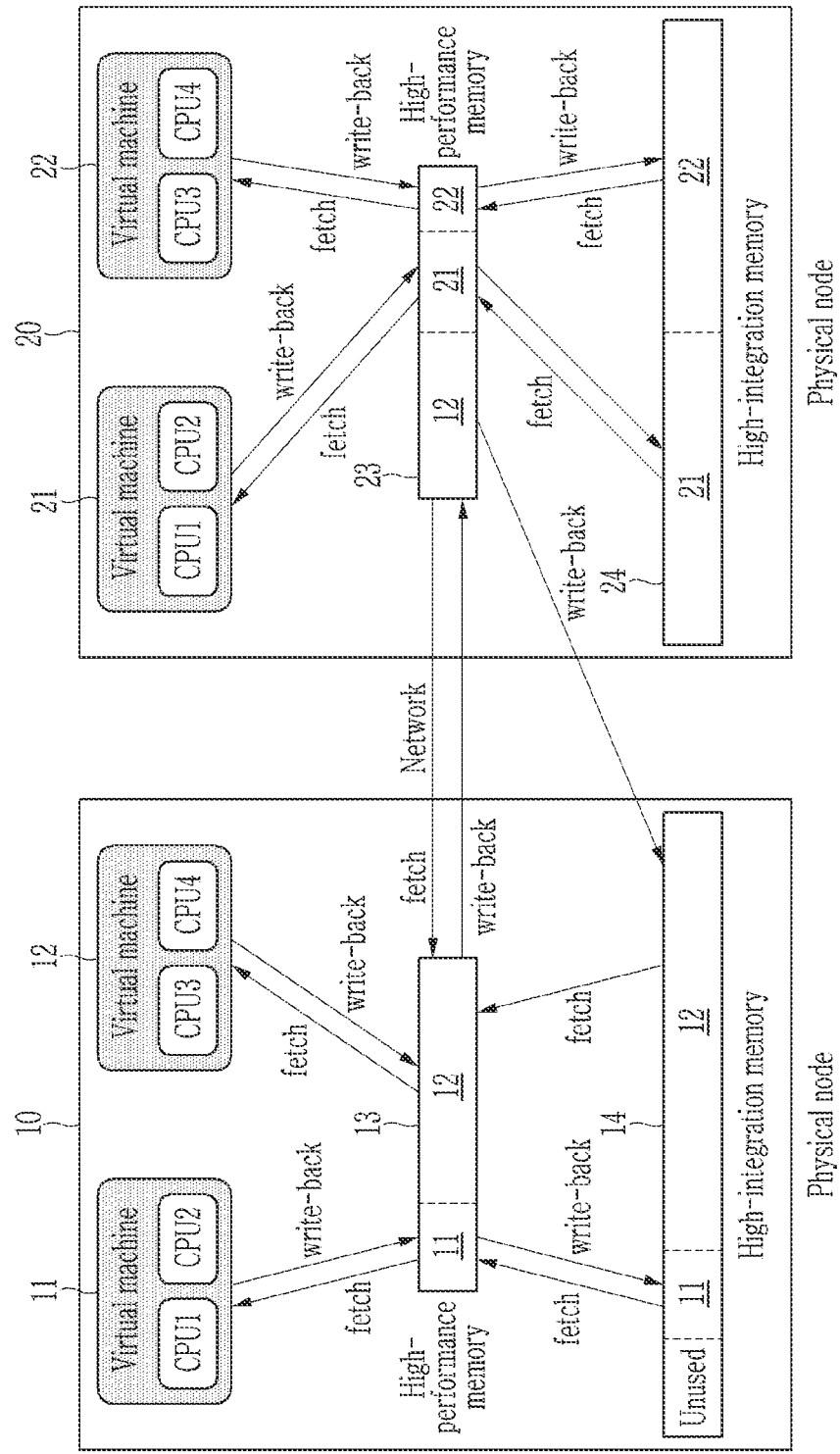
FIG. 5 is a diagram illustrating an example of a memory access method of each virtual machine according to an embodiment.

FIG. 5 is a diagram illustrating an example of a memory access method of each virtual machine according to an embodiment.

Referring to FIG. 5, the two physical nodes 10 and 20 are connected by a high-speed network, and all virtual machines 11, 12, 21, and 22 placed on the physical nodes 10 and 20 secure all the capacity of the necessary memory from the high-integration memory 14 and 24 in the physical node 10 and 20 on which it is placed through the apparatus for memory integrated management 100. For example, the virtual machines 11 and 12 placed on the physical node 10 can secure all the necessary memory through the high-integration memory 14 in the physical node 10, respectively, and the virtual machines 21 and 22 placed on the physical node 20 can secure all the necessary memory through the high-integration memory 24 in the physical node 20, respectively.

In addition, in order to increase the average performance of the virtual machines 11, 12, 21, and 22 placed in the physical nodes 10 and 20, the high-performance memories 13 and 23 are utilized. The virtual machines 11, 12, 21, and 22 secure as much of high-performance memories 13 and 23 as necessary to ensure the performance of the corresponding virtual machines 11, 12, 21, and 22 through the apparatus for memory integrated management 100. In this case, some virtual machines may be allocated high-performance memory of other physical nodes. For example, the virtual machine 12 in the physical node 10 may be partially allocated the high-performance memory 23 of the other physical node 20.

The CPUs in each physical node 10 and 20 can access only the high-performance memories 13 and 23 to which they are directly connected when performing an operation. Therefore, the virtual machines 11, 12, 21, and 22 first fetch the data to be accessed into the high-performance memories 13 and 23 of the physical node 10 and 20 on which they are placed, and access the data. In the process of finding the data to be accessed by the virtual machine 12, if there is no data in the high-performance memory 13 in the corresponding physical node 10, the virtual machine finds the high-performance memory 23 in the other physical node 20 with a faster access speed preferentially and then finds data in the high-integration memory 14 in the corresponding physical node 10.

If the data to be accessed by the virtual machine 12 is in the high-performance memory 23 of another physical node 20 or the high-integration memory 14 of the physical node 10 in which it is placed, in both cases, the virtual machine fetches data to be accessed into the high-performance memory 13 of the physical node 10 and access the data.

At this time, if all of the allocated high-performance memory 13 is being used, the virtual machine removes data that is less likely to be accessed again within a short time among data in the high-performance memory 13 from the high-performance memory 13. A common method such as the method used by the Linux swap system or the method used in another partitioned memory or disaggregated memory can be used as for which data is to be removed.

When the virtual machine 12 removes data from the high-performance memory 13 in the physical node 10, if the high-performance memory 23 of the other physical node 20 is allocated, the virtual machine 12 may sent data to the high-performance memory 23 of the other physical node 20. Data removed from the high-performance memory 13 and sent to the high-performance memory 23 of another physical node 20 is data with the highest accessibility except for data in the high-performance memory 13 of the physical node 10. Since accessing the high-performance memory 23 of the other physical node 20 by the CPU is faster than accessing the high-integration memory 14, the virtual machine 12 sends data with the highest accessibility immediately next to the data in high-performance memory 13 to the high-performance memory 23 of the physical node 20. On the other hand, if all of the high-performance memory 23 of the other physical node 20 is being used, the virtual machine 12 selects data with the lowest accessibility from the high-performance memory 13 in the physical node 10 as data to be removed, and sends the selected data to the allocated high-integration memory 14 for write-back. However, since the high-integration memory 14 is allocated as much as all the memory areas used by the virtual machine 12 and data is not removed, if the data has never been updated after being fetched into the high-performance memory 13, the corresponding data may not be written back to the high-integration memory 14.

Figure 6:
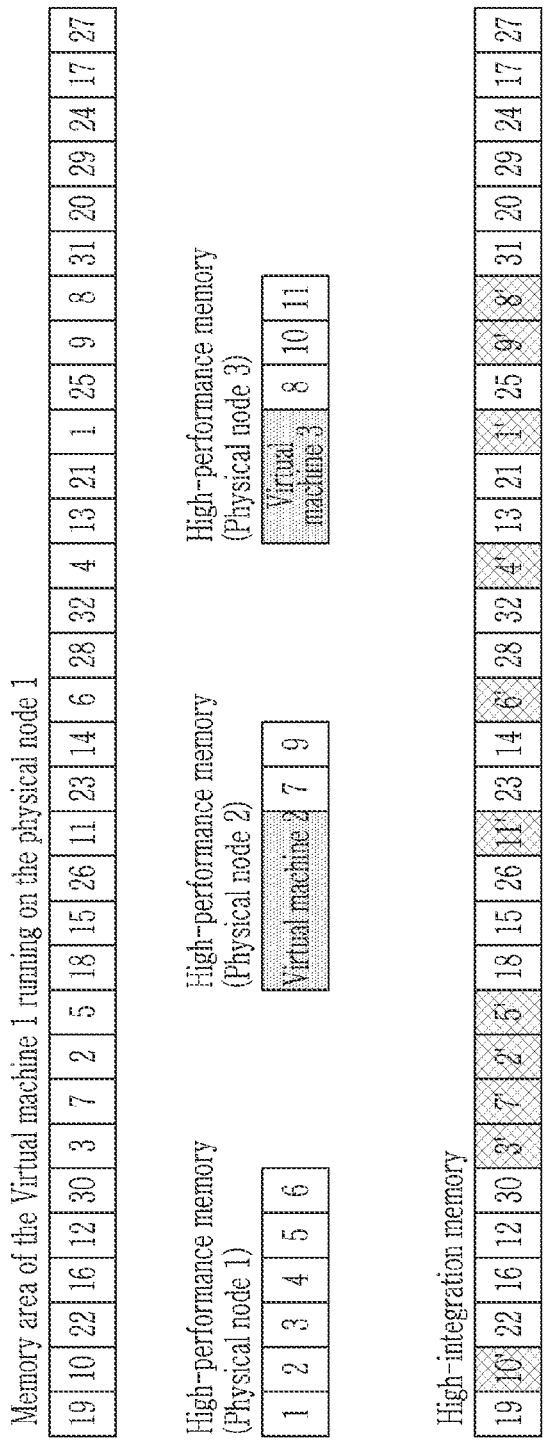
FIG. 6 is a diagram illustrating an example of real memory arrangement in memory areas of a virtual machine according to an embodiment.

FIG. 6 is a diagram illustrating an example of real memory arrangement in memory areas of a virtual machine according to an embodiment.

Referring to FIG. 6, the apparatus for memory integrated management 100 allocates a high-integration memory of as much as the memory capacity required for the virtual machine 1 when the virtual machine 1 is generated.

The apparatus for memory integrated management 100 allocates high-performance memory to the virtual node 1. The apparatus for memory integrated management 100 allocates the high-performance memory of the physical node 1, the high-performance memory of the physical node 2, and the high-performance memory of the physical node 3, which can store 6, 2, and 3 data, respectively, to the virtual node 1.

It is assumed that virtual machine 1 running on physical node 1 has a total of 32 pieces of data. The 32 pieces of data are stored in the physical memory area recognized by the virtual machine 1, and when the virtual machine 1 wants to access the data, the program (e.g., a virtual machine monitor or hypervisor) that manages the virtual machine moves the data to the high-performance memory, and connects the memory areas recognized by the virtual machine to the location of the high-performance memory.

When the virtual machine 1 wants to access data from No. 1 to No. 9, 6 pieces of data from No. 1 to No. 6 are placed in the high-performance memory of the physical node 1 in the order of the most recent access, and 5 pieces of data from No. 7 to No. 11 accessed in the following order are placed in the high-performance memory of the physical node 2 and the physical node 3. At this time, the data placement order between the high-performance memories of the other physical node 2 and the physical node 3 is not determined. In FIG. 6, data of No. 7 and No. 9 are placed in the high-performance memory of the physical node 2, and data No. 8, 10, and 11 are placed in the high-performance memory of the physical node 3, are shown.

All data of virtual machine 1 are stored in the high-integration memory of physical node 1. The data in the high-integration memory is not updated every time the data in the high-performance memory is updated. Updated data on the high-performance memory is moved to the high-integration memory when a write-back condition occurs (i.e., when it is removed from the high-performance memory). Accordingly, data from No. 1 to No. 11 in the high-performance memory of the physical node 1, physical node 2, and physical node 3 can be updated, and the updated data of No. 1' to No. 11' may be moved to the high-integration memory when a write-back state occurs.

The apparatus for memory integrated management 100 according to an embodiment secures memory capacity required for a virtual machine through a high-integration memory in which it is easy to secure capacity but has a slow access speed, thereby enabling a large amount of memory expansion at a low cost. In addition, the apparatus for memory integrated management 100 efficiently uses high-performance memories and enables high-performance memory expansion by integrating and managing high-performance memories with a high access speed in a cluster unit.

As such, the apparatus for memory integrated management 100 according to an embodiment uses two-stage memory expansion. Memory expansion of the first stage indicates the use of one type of memory in addition to the high-performance memory in the physical node. According to an embodiment, in addition to the high-performance memory in the physical node, a high-performance memory of another physical node or a high-integration memory in the corresponding physical node may be used. The memory expansion of the second stage indicates the use of two types of memory in addition to the high-performance memory in the physical node, and the two types of memory can be used in order. According to an embodiment, in addition to the high-performance memory in the physical node, both the high-performance memory of another node and the high-integration memory of the corresponding physical node may be used.

Figure 7:
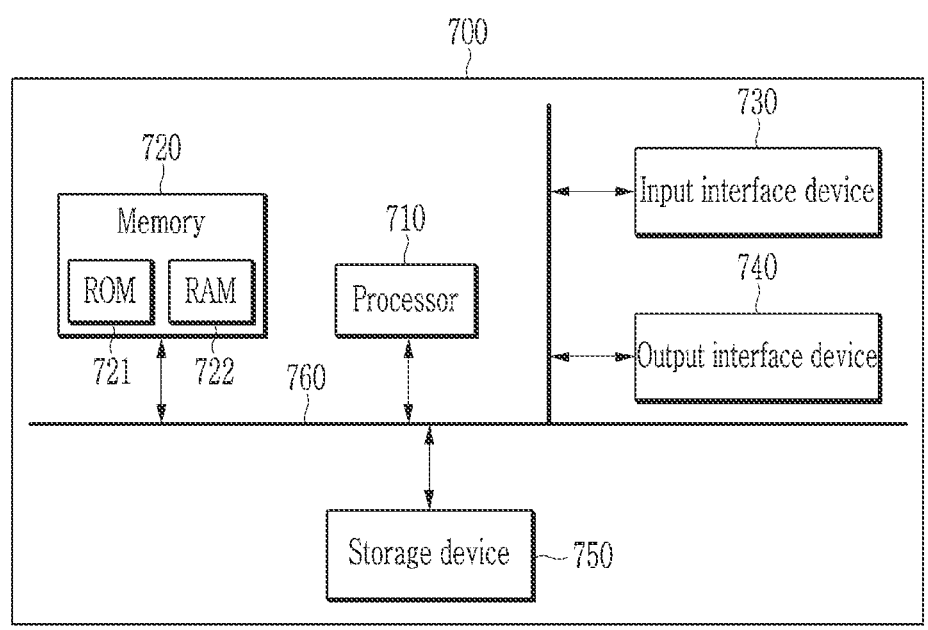
FIG. 7 is a diagram illustrating an apparatus for memory integrated management according to another embodiment.

FIG. 7 is a diagram illustrating an apparatus for memory integrated management according to another embodiment.

Referring to FIG. 7, the apparatus for memory integrated management 700 may represent a computing device in which the method for memory integrated management according to the embodiment described above is implemented.

The apparatus for memory integrated management 700 may include at least one of a processor 710, a memory 720, an input interface device 730, an output interface device 740, and a storage device 750. Each of the components may be connected by a common bus 760 to communicate with each other. In addition, each of the components may be connected through an individual interface or an individual bus centered on the processor 710 instead of the common bus 760.

The processor 710 may be implemented as various types such as an application processor (AP), a central processing unit (CPU), a graphics processing unit (GPU), etc., and may be any semiconductor device that executes a command stored in the memory 720 or the storage device 750. The processor 710 may execute a program command stored in at least one of the memory 720 and the storage device 750. The processor 710 may be configured to implement the method for memory integrated management described above with reference to FIGS. 1 to 6. For example, the processor 710 may load program commands for implementing at least some functions of the memory profilers $110_1$, $110_2$, $110_3$, and $110_4$, the high-performance memory distributor 120 and the high-integration memory distributor 130 described in FIG. 1 sent to the memory 720, and may perform the operation described with reference to FIGS. 1 to 6.

The memory 720 and the storage device 750 may include various types of volatile or nonvolatile storage media. For example, the memory 720 may include a read-only memory (ROM) 721 and a random access memory (RAM) 722. In an embodiment of the present invention, the memory 720 may be located inside or outside the processor 710, and the memory 720 may be connected to the processor 710 through various known means.

The input interface device 730 is configured to provide data to the processor 710.

The output interface device 740 is configured to output data from the processor 710.

In addition, at least some of the method for memory integrated management according to an embodiment may be implemented as a program or software executed in a computing device, and the program or software may be stored in a computer-readable medium.

In addition, at least a part of the method for memory integrated management according to an embodiment may be implemented as hardware that can be electrically connected to the computing device.

According to an embodiment, by using the integrated management of DRAM, a non-volatile memory, a high-performance SSD, etc. of the cluster system as a memory, a large-scale memory expansion at a low cost is possible, and the overall performance of the system may be improved by efficiently using the entire DRAM of the cluster system. The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk and a read only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the invention. It will be apparent to one of ordinary skill in the art that various modifications of the embodiments may be made without departing from the spirit and scope of the claims and their equivalents.

What is claimed is:

1. A method for memory integrated management in an apparatus for memory integrated management of a cluster system including a plurality of physical nodes connected to each other by a network, the method comprising:
   determining one of the plurality of physical nodes as a node to place a new virtual machine;
   allocating the first type of memory allocated to the one physical node to the new virtual machine as much as the memory capacity required by the new virtual machine; and
   distributing the second type of memory to a plurality of virtual machines running on the plurality of physical nodes by integrating and managing the second type of memory allocated to each of the plurality of physical nodes,
   wherein the memory of the second type has a faster access speed than that of the first type of memory,
   wherein the determining includes:
   selecting a physical node in which the amount of the first type of memory available from among the plurality of physical nodes is greater than the memory capacity required for the new virtual machine;
   calculating the average performance of virtual machines running on each of the selected physical nodes; and
   determining a physical node having the highest average performance of the running virtual machines as a node on which to place the new virtual machine.

2. A method for memory integrated management in an apparatus for memory integrated management of a cluster system including a plurality of physical nodes connected to each other by a network, the method comprising:
- determining one of the plurality of physical nodes as a node to place a new virtual machine;
- allocating the first type of memory allocated to the one physical node to the new virtual machine as much as the memory capacity required by the new virtual machine; and
- distributing the second type of memory to a plurality of virtual machines running on the plurality of physical nodes by integrating and managing the second type of memory allocated to each of the plurality of physical nodes,
- wherein the memory of the second type has a faster access speed than that of the first type of memory,
- wherein the distributing the second type of memory includes:
- distributing the second type of memory allocated to each physical node to virtual machines running in the corresponding physical node, respectively; and
- additionally distributing the remaining second type of memory in the cluster system to at least one virtual machine among the plurality of virtual machines,
- wherein the distributing the second type of memory allocated to each physical node to virtual machines running in the corresponding physical node, respectively includes:
- distributing the memory of the second type as much as the memory capacity required to guarantee the performance of the virtual machine for each virtual machine running in the corresponding physical node; and
- when the second type of memory distributed to the virtual machine running in the corresponding physical node exceeds the capacity of the second type of memory allocated to the corresponding physical node, reducing the second type of memory of the virtual machine of which performance is reduced the least when the second type of memory is reduced by the unit capacity set for each virtual machine, by the unit capacity.

3. The method of claim 2, wherein the distributing of the second type of memory allocated to each physical node to virtual machines running in the corresponding physical node, respectively further includes:
- repeating the reducing step until the capacity of the second type of memory allocated to the virtual machine running in the corresponding physical node does not exceed the capacity of the second type of memory allocated to the corresponding physical node.

4. A method for memory integrated management in an apparatus for memory integrated management of a cluster system including a plurality of physical nodes connected to each other by a network, the method comprising:
- determining one of the plurality of physical nodes as a node to place a new virtual machine;
- allocating the first type of memory allocated to the one physical node to the new virtual machine as much as the memory capacity required by the new virtual machine; and
- distributing the second type of memory to a plurality of virtual machines running on the plurality of physical nodes by integrating and managing the second type of memory allocated to each of the plurality of physical nodes,
- wherein the memory of the second type has a faster access speed than that of the first type of memory,
- wherein the distributing the second type of memory includes:
- distributing the second type of memory allocated to each physical node to virtual machines running in the corresponding physical node, respectively; and
- additionally distributing the remaining second type of memory in the cluster system to at least one virtual machine among the plurality of virtual machines,
- wherein the additionally distributing includes:
- increasing the second type of memory by a unit capacity to a virtual machine of which performance is increased the most when the second type of memory is increased by the unit capacity among the plurality of virtual machines running in the plurality of physical nodes; and
- repeating the increasing step until all of the remaining second type of memory in the cluster system is distributed.

5. An apparatus for memory integrated management in a cluster system including a plurality of physical nodes connected to each other by a network, the apparatus comprising:
- a high-integration memory distributor that integrates and manages a first type of memory allocated to the plurality of physical nodes, and distributes the first type of memory allocated to the corresponding physical node to virtual machines each executed in the plurality of physical nodes; and
- a high-performance memory distributor that integrates and manages a second type of memory allocated to the plurality of physical nodes, respectively, and distributes the second type of memory to a plurality of virtual machines in the cluster system in a direction that can maximize the average performance of the plurality of virtual machines,
- wherein the memory of the second type has a faster access speed than that of the first type of memory,
- wherein the high-integration memory distributor distributes the first type of memory of as much as the memory capacity required by a new virtual machine when the new virtual machine is generated,
- wherein the high-integration memory distributor selects a physical node in which the amount of the first type of memory available from among the plurality of physical nodes is greater than the memory capacity required for the new virtual machine, and determines a physical node having the highest average performance of the running virtual machines running on each of the selected physical nodes among the selected physical nodes, as a node on which to place the new virtual machine.

6. An apparatus for memory integrated management in a cluster system including a plurality of physical nodes connected to each other by a network, the apparatus comprising:
- a high-integration memory distributor that integrates and manages a first type of memory allocated to the plurality of physical nodes, and distributes the first type of memory allocated to the corresponding physical node to virtual machines each executed in the plurality of physical nodes; and
- a high-performance memory distributor that integrates and manages a second type of memory allocated to the plurality of physical nodes, respectively, and distributes the second type of memory to a plurality of virtual machines in the cluster system in a direction that can maximize the average performance of the plurality of virtual machines,
- wherein the memory of the second type has a faster access speed than that of the first type of memory, wherein the high-performance memory distributor distributes the second type of memory allocated to each physical node to virtual machines running in the corresponding physical node, respectively, and additionally distributes the remaining second type of memory in the cluster system to at least one virtual machine among the plurality of virtual machines, wherein the high-performance memory distributor distributes the memory of the second type of as much as the memory capacity required to guarantee the performance of the virtual machine for each virtual machine running in the corresponding physical node, and reduces the second type of memory of the virtual machine of which performance is reduced the least when the second type of memory is reduced by the unit capacity set for each virtual machine, by the unit capacity when the second type of memory distributed to the virtual machine running in the corresponding physical node exceeds the capacity of the second type of memory allocated to the corresponding physical node.

7. An apparatus for memory integrated management in a cluster system including a plurality of physical nodes connected to each other by a network, the apparatus comprising:

a high-integration memory distributor that integrates and manages a first type of memory allocated to the plurality of physical nodes, and distributes the first type of memory allocated to the corresponding physical node to virtual machines each executed in the plurality of physical nodes; and a high-performance memory distributor that integrates and manages a second type of memory allocated to the plurality of physical nodes, respectively, and distributes the second type of memory to a plurality of virtual machines in the cluster system in a direction that can maximize the average performance of the plurality of virtual machines, wherein the memory of the second type has a faster access speed than that of the first type of memory, wherein the high-performance memory distributor distributes the second type of memory allocated to each physical node to virtual machines running in the corresponding physical node, respectively, and additionally distributes the remaining second type of memory in the cluster system to at least one virtual machine among the plurality of virtual machines, wherein when the remaining second type of memory in the cluster system is present, the high-performance memory distributor increases the second type of memory by a unit capacity to a virtual machine of which performance is increased the most when the second type of memory is increased by the unit capacity among the plurality of virtual machines running in the plurality of physical nodes.

* * * * *